United States Patent [19]
Abe

[11] 4,225,211
[45] Sep. 30, 1980

[54] RANDOM PHASE PLATE FOR HOLOGRAPHY AND PROCESS FOR MANUFACTURING SAME

[75] Inventor: Michiharu Abe, Yokohama, Japan

[73] Assignee: Ricoh Company, Ltd., Tokyo, Japan

[21] Appl. No.: 937,220

[22] Filed: Aug. 28, 1978

Related U.S. Application Data

[63] Continuation-in-part of Ser. No. 796,310, May 12, 1977, abandoned, which is a continuation of Ser. No. 653,776, Jan. 30, 1976, abandoned.

[30] Foreign Application Priority Data

Jan. 30, 1975 [JP] Japan ................. 50-13091

[51] Int. Cl.² ............................................. G03H 1/16
[52] U.S. Cl. .................................. 350/3.82; 350/314; 427/165; 427/287
[58] Field of Search ................ 350/3.81, 3.82, 3.83, 350/3.84, 314; 427/164, 165, 256, 257, 283, 287

[56] References Cited

U.S. PATENT DOCUMENTS

| | | | |
|---|---|---|---|
| 3,625,729 | 12/1971 | Grabowski | 427/287 X |
| 3,829,193 | 8/1974 | Tsunoda et al. | 350/3.82 |
| 3,883,232 | 5/1975 | Tsunoda | 350/314 |
| 3,995,948 | 12/1976 | Abe et al. | 350/3.82 |

Primary Examiner—John K. Corbin
Assistant Examiner—John D. Lee

[57] ABSTRACT

A coating material such as a solution of polyvinyl butyral resin in benzene is applied to a transparent base in such a manner that the thickness thereof varies in a continuous and random manner so that concentration of light in the central area of a hologram produced using the plate is below a predetermined tolerable value.

4 Claims, 5 Drawing Figures

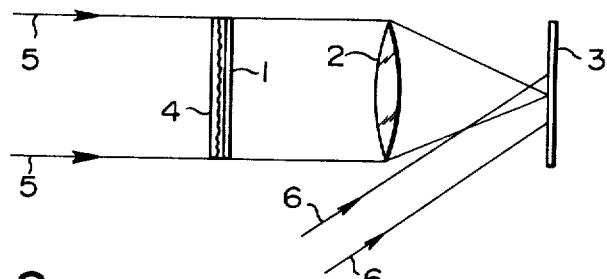
FIG.1
FIG.2
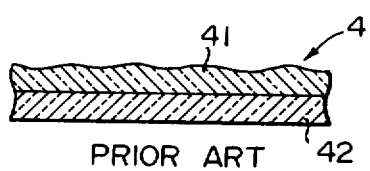
PRIOR ART
FIG.3
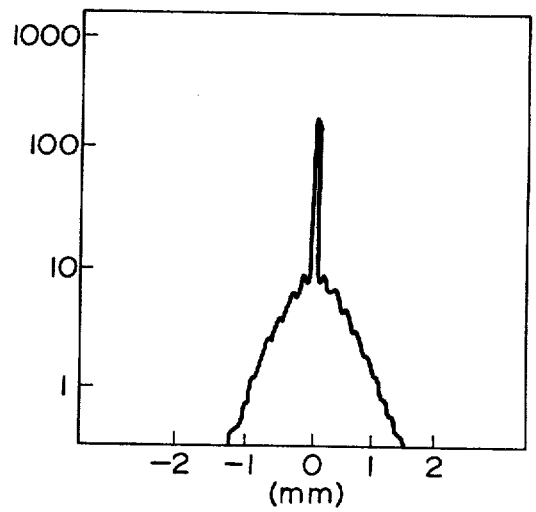
FIG.4
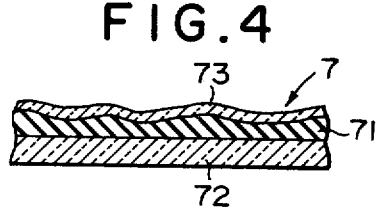
FIG.5
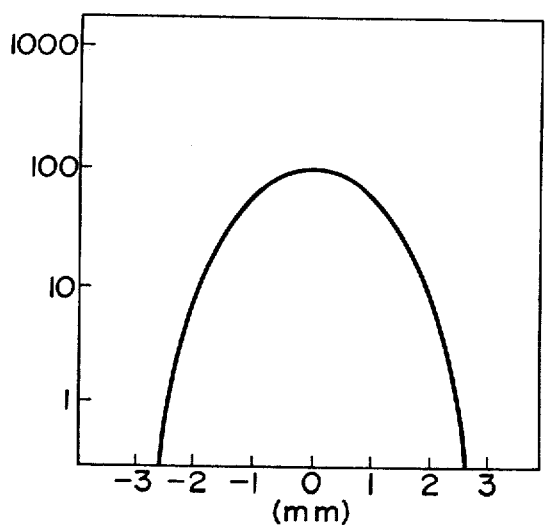

RANDOM PHASE PLATE FOR HOLOGRAPHY AND PROCESS FOR MANUFACTURING SAME

RELATED APPLICATION

This application is a continuation in part of prior filed copending application Ser. No. 796,310 filed May 12, 1977 which is a continuation application of prior filed application Ser. No. 653,776 filed Jan. 30, 1976, both abandoned.

The present invention relates to a random phase plate for Fourier transform holography and a process for manufacturing the plate.

It is known in the art of holography to place a random phase plate in contact with a subject illuminated by coherent light from a laser for holographic reproduction. The subject in a process to which the invention relates is generally in the form of a two dimensional transparency, although the invention is not limited to such a subject. Light from the subject is focussed onto a light sensitive medium by a Fourier transform lens. The random phase plate serves to prevent excessive concentration of light in the central area of the light sensitive medium. A coherent reference beam is radiated onto the light sensitive medium at an angle to produce an interference pattern with the Fourier transformed image of the subject to produce the hologram. The random phase plate achieves its function by varying the phase of the light passing therethrough in a continuous and random manner so that a hologram with high redundancy and low speckle noise with good linearity is produced.

Known random phase plates are generally prepared by dissolving a polymer such as resin ester, polystyrene, polyvinyl alcohol, polyvinyl acetate, silicon resin or epoxy resin in a solvent with a low boiling point and surface tension. The solution is applied to the surface of a glass plate by means of a centrifugal or similar coating apparatus. Expansion or contraction of the polymer in combination with the surface tension of the solvent creates a random and continuous pattern of ridges and valleys on the surface of the coating as the solvent evaporates which is solidified in place on the finished plate. A satisfactory random phase plate must fulfill the following requirements:

1. It must produce uniform and speckle-free illumination of the subject; and
2. The intensity of light incident on the light sensitive medium must be uniform, distributed over the proper area and band limited.

In practice, the first requirement can be satisfied by placing the random phase plate in close contact with the subject. The second requirement has not been satisfactorily met by known random phase plates. Particularly, in order to avoid a bright spot in the center of the hologram which results in an intensity distribution beyond the range of linearity of the recording medium, the total luminous flux incident on the recording medium must be distributed in such a manner that less than 10% thereof is concentrated in a central bright spot. Prior art random phase plates are not able to produce this desired result.

It is therefore an object of the present invention to provide a random phase plate for Fourier transform holography which distributes light on a light sensitive holographic recording medium in a uniform manner suitable for Fourier transform holography.

It is another object of the present invention to provide a process for manufacturing the random phase plate.

It is another object of the present invention to provide a random phase plate for holography comprising a transparent substrate and a transparent coating formed on the substrate, the thickness H of the coating varying in a random and continuous manner relative to light of a wavelength $\lambda$ such that $$\exp -4\pi^2(n-n\delta)^2 \sigma h^2/\lambda^2 \leq 0.10$$

where $h_m$ is the mean value of H, $h = H - h_m$, $\sigma h$ is the standard deviation of h, n is the refractive index of the coating for light of the wavelength $\lambda$, $n\delta$ is the refractive index of air for light of the wavelength $\lambda$ and exp indicates exponentiation.

The above and other objects, features and advantages of the present invention will become clear from the following detailed description taken with the accompanying drawings, in which:

FIG. 1 is a schematic view of a holographic system to which the present invention is applicable;

FIG. 2 is a sectional view of a prior art random phase plate;

FIG. 3 is a graph showing the distribution of luminous intensity on a recording medium produced by the plate shown in FIG. 2;

FIG. 4 is a sectional view of a random phase plate embodying the present invention; and FIG. 5 is a graph showing the distribution of luminous intensity on a recording medium produced by the plate shown in FIG. 4.

Referring now to FIG. 1, a subject 1 for holographic reproduction is in the form of a transparency. A coherent light beam 5 having a wavelength of, for example, 6328 Å is radiated through the subject 1 from an He-Ne laser (not shown). A random phase plate 4 is disposed in close contact with the subject 1 so that the beam 5 passes through the random phase plate 4 before reaching the subject 1. A Fourier transform lens 2 having a focal length of, for example, 150 mm is arranged to focus an image of the subject on a light sensitive holographic recording medium 3. A reference beam 6 from the laser is radiated onto the medium 3 at an angle to interfere with the image of the subject 1. The resulting interference pattern is recorded on the medium 3 as a holographic reproduction of the subject 1. The hologram therefore represents the Fourier transform of the complex intensity distribution of the illumination of the subject 1.

A typical prior art random phase plate 4 is shown in FIG. 2 as comprising a substrate in the form of a transparent glass plate 42 and a transparent coating 41, the thickness of which varies in a random and continuous manner to form a pattern of ridges and valleys on the upper surface (in FIG. 2) of the plate 4. The plate 4 is prepared by applying a solution of STAYBELLITE ESTER 10 (tradename of the Hercules Powder Co. Ltd.) in n-hexane onto the plate 42 using a centrifugal or similar coating apparatus (not shown). STAYBELLITE ESTER 10 is a resin ester hydrogenated. The solvent, n-hexane, is then allowed to evaporate. The dimensional change of the ester in combination with the surface tension of the solvent causes the coating 41 to form ridges and valleys in a random manner which solidify as the solvent evaporates.

In FIG. 3, the abscissa represents the distance from the center of the medium 3 and the ordinate represents the relative luminous intensity. FIG. 3 represents a case in which no subject 1 is present, and the intensity distribution is that of the random phase plate 4 alone. This type of graph is known in the art as a "Wiener Spectrum". It will be seen that in the central part of the medium 3, the intensity is extremely high compared to the remainder of the medium 3. The result is that there will be an extremely bright spot in the center of the resulting hologram. This will cause a severely distorted reproduction if the linear range of the recording medium 3 is exceeded. It has been determined experimentally that the amount of light concentrated in the central area of the medium 3 must be less than 10% of the total luminous flux incident on the medium 3. A prior art random phase plate 4 is not able to achieve this effect.

If (x,y) are the rectangular coordinates of any point on the random phase plate 4, the thickness H of the coating 41 at the point (x,y) is H(x,y). If $h_m$ is the mean value of the thickness H, the difference between the thickness H and the mean thickness $h_m$ is h(x,y)=H(x,y)−$Hh_m$. The phase of the light emerging from the point (x,y) is $\phi(x,y)$, which has the value $$\phi(x,y) = \frac{2\pi h(x,y)}{\lambda}(n - n_o) \quad (1)$$

where
$\lambda$ is the wavelength of the laser light;
n is the refractive index of the coating 41 for the wavelength $\lambda$; and
$n_o$ is the refractive index of air for the wavelength $\lambda$.

The standard deviation of h(x,y) is designated as $\sigma_h$. The complex amplitude of the light at the point (x,y) is given as exp $i\phi(x,y)$ where $i=\sqrt{-1}$ and exp indicates exponentiation. The complex amplitude of the light incident on the medium 3 is the Fourier transform of exp $i\phi(x,y)$ except for the constant, and squaring the absolute value of this quantity provides the intensity of light on the medium 3 (the Wiener spectrum W). The Wiener spectrum W may also be obtained by taking the Fourier transform of the autocorrelation of exp $i\phi(x,y)$. This has the value, for any point (x',y'), $$W(x',y') = \lim_{\substack{x\to\infty \\ y\to\infty}} \frac{1}{4xy} \int_{-x}^{x}\int_{-y}^{y} \exp i\phi(x,y) \exp -i\phi(x-x',y-y')\,dx\,dy \quad (2)$$

The luminous intensity in the central area is proportional to the constant component $W(\infty,\infty)$, for which x' and y'$=\infty$, which is out of the autcorrelation range. Integration of equation (2) for $W(\infty,\infty)$ gives $$W(\infty,\infty) = \int_{-\infty}^{+\infty} \exp i\Delta\phi\, f(\Delta\phi)d\Delta\phi \quad (3)$$

where $\Delta\phi$ is the difference between two values of $\phi(x,y)$, and f($\Delta\phi$) represents the probability distribution of $\Delta\phi$. f($\Delta\phi$) satisfies the normal condition $$\int_{-\infty}^{\infty} f(\Delta\phi)d\Delta\phi = 1 \quad (4)$$

The probability distribution of h(x,y) is also normal, and the standard deviation of f($\alpha\phi$) is obtained by multiplying the standard deviation of $\phi(x,y)$ by $\sqrt{2}$. Equation (3) can therefore be written as $$W(\infty,\infty) = \int_{-\infty}^{\infty} \exp i\Delta\phi \exp -\frac{(\Delta\phi)^2}{2(\sqrt{2\sigma})^2}\,d\Delta\phi \quad (5)$$

Integration of equation (5) produces $$W(\infty,\infty)=\exp(-\sigma^2) \quad (6)$$

where $\sigma$ is the standard deviation of $\phi(x,y)$ which is obtained by multiplying the standard deviation $\sigma_h$ of h(x,y) by $2\pi(n-n_o)/\lambda$.
This produces $$W(\infty,\infty)=\exp -4\pi^2(n-n_o)^2\sigma_h^2/\lambda^2 \quad (7)$$

In order that less than 10% of the light incident on the surface of the medium 3 be concentrated in the central area, $$W(\infty,\infty)=\exp(-\sigma^2)\leq 0.10 \text{ and} \quad (8)$$

$$\exp -4\pi^2(n-n_o)^2\sigma_h^2/\lambda^2 \leq 0.10 \quad (9)$$

Prior art random phase plates 4 are not able to fulfill these conditions. The value of $\sigma$ in accordance with equation (9) must be greater than 1.5 radians.

As shown in FIG. 4, a random phase plate 7 embodying the present invention is adapted to replace the unsatisfactory random phase plate 4. The plate 7 is formed in a manner similar to the plate 4 by a centrifugal coater (Spinner). However, the plate 7 preferably comprises a glass plate 72, on which a coating 71 of ESLEC BLS (tradename of the Sekisui Chemical Co., Ltd.), a polyvinyl butyral resin is formed. A protective layer 73 of an inorganic dielectric is formed on the coating 71. The coating 71 is formed by dissolving the ESLEC BLS in benzene solvent and applying the solution to the plate 72. The required pattern will be formed as the benzene evaporates and the ESLEC BLS solidifies.

Examination of equations (8) and (9) will show that $W(\infty,\infty)$ approaches zero rapidly as $\sigma_h$ increases. Equation (9) can thereby be satisfied by controlling the evaporation conditions of the coating 71 so that the value of $\sigma_h$ is sufficiently large.

Since stresses in the ESLEC BLS tend to deform the coating 71 during solidification to increase $\sigma_h$ and the surface tension of the solution tends to decrease $\sigma_h$, it is required that the solvent have a low boiling point and low surface tension when the plate 7 is manufactured at room temperature (between 10° C. and 30° C.).

The Wiener spectrum of the plate 7 is shown in FIG. 5. In accordance with equation (6), it will be understood that a high intensity region in the center of the medium 3 is caused by concentration of light, and that this concentration will be eliminated if $\sigma$ is sufficiently high. It will be seen that there is no high intensity region in the center of the curve of FIG. 5 as there is in FIG. 3.

Referring to equation (7), it will be seen that the Wiener spectrum is inversely proportional to the square of the wavelength $\lambda$. This means that a random phase plate which does not fulfill the condition of equation (9) at one value of $\lambda$ will do so at a smaller value of $\lambda$.

The best method for the preparation of a new random phase holographic plate of this invention which will satisfy the claimed equation set forth above comprises the steps of:

(1) dissolving a solidifiable substance (polyvinyl butyral resin: ESLEC BLS) in a solvent (benzene) at a temperature between 10° C. and 30° C. to obtain a solution as a transparent coating material in fluid form, the proportion of the polyvinyl butyral resin being 17.5% by weight in the solution;

(2) applying the solution to the upper surface of a transparent substrate such as a glass plate; and (3) rotating the substrate for at least 10 seconds at a rate of 200 to 1500 rpm about a rotary axis perpendicularly passing through its center by means of a spinner coater so as to evaporate the benzene solvent and solidify the polyvinyl butyral resin on the glass plate.

Various modifications within the scope of the present invention will be possible for those skilled in the art after receiving the teachings of the present disclosure.

What is claimed is:

1. A process for producing a random phase holographic plate coated with polyvinyl butyral resin in which the thickness H of the resin varies in a continuous and random manner over the said plate relative to light of a wavelength $\lambda$ such that $$\exp -4\pi^2(n-n_o)^2\sigma h^2/\lambda^2 \leq 0.10$$

where $h_m$ is a mean value of H, $h = H - h_m$;

$\sigma h$ is a standard deviation of h;

n is a refractive index of the solidified coating material for light of the wavelength $\lambda$;

$n_o$ is a refractive index of air for light of the wavelength $\lambda$; and exp indicates exponentiation, comprising the steps of:

(a) applying a 17.5% by weight solution of polyvinyl butyral resin in benzene to the upper surface of a transparent substrate, and (b) solidifying the solution by rotating the substrate about a perpendicular rotary axis at a rate of from 200 to 1500 rpm to evaporate the solvent.

2. The process according to claim 1 in which the substrate is a glass plate.

3. A random phase holographic plate, comprising a transparent substrate and a transparent polyvinyl butyral coating on the substrate in which the thickness H of the coating varies in a continuous and random manner over the random phase plate relative to light of a wavelength $\lambda$ such that $$\exp -4\pi^2(n-n_o)^2\sigma_h^2/\lambda^2 \leq 0.10$$

where $h_m$ is a mean value of H, $h = H - h_m$;

$\sigma_h$ is a standard deviation of h;

n is a refractive index of the coating material for light of the wavelength $\lambda$;

$n_o$ is a refractive index of air for light for the wavelength $\lambda$; and exp indicates exponentiation.

4. The plate according to claim 3, in which the transparent substrate comprises a glass plate.

* * * * *